Figure 1A:
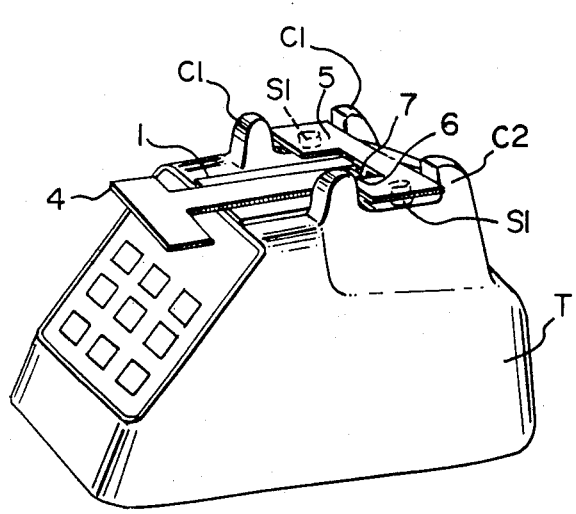

United States Patent [19]

Conlon

[11] Patent Number: 4,614,845

[45] Date of Patent: Sep. 30, 1986

[54] TELEPHONE HOOKSWITCH FLASHER

[75] Inventor: Peter Conlon, P.O. Box 311, Munster Hamlet, Ontario, Canada, K0A 3P0

[73] Assignee: Peter Conlon, Ontario, Canada

[21] Appl. No.: 634,277

[22] Filed: Jul. 25, 1984

[30] Foreign Application Priority Data

Nov. 22, 1983 [CA] Canada .................. 441701

[51] Int. Cl.⁴ ............................... H04M 1/06
[52] U.S. Cl. ................................... 179/159
[58] Field of Search .......... 179/159, 162, 161, 146 R, 179/164

[56] References Cited

U.S. PATENT DOCUMENTS

| | | | |
|---|---|---|---|
| 2,300,114 | 10/1942 | Golseth | 179/164 |
| 2,558,661 | 6/1951 | Murray | 179/178 |
| 3,226,491 | 12/1965 | Spangler | 179/161 |

*Primary Examiner*—Thomas W. Brown
*Attorney, Agent, or Firm*—Laff, Whitesel, Conte & Saret

[57] ABSTRACT

A mechanical apparatus for flashing a hookswitch of a telephone set. The apparatus is comprised of a baseplate for retention on a telephone set, and first and second co-operative planar members resiliently hinged to an edge of the baseplate, whereby the second member depresses the hookswitch in response to the first member being depressed a first predetermined amount, and subsequently releases the hookswitch in response to the first member being further depressed. The apparatus provides an accurately timed hookswitch flash in response to simple mechanical co-operation between the first and second members. The apparatus is easily installed, does not require specially modified circuitry and is highly reliable as a result of its simple construction.

16 Claims, 7 Drawing Figures

TELEPHONE HOOKSWITCH FLASHER

This invention relates to the field of subscriber telephone sets and particularly to a mechanical hookswitch flasher.

Present day PABXs frequently require that a subscriber should momentarily depress the hookswitch of his or her telephone set in order to implement special features of the PABX. For instance, to put an incoming call on hold or to forward the call to another extension, the local subscriber flashes the hookswitch and subsequently dials a predetermined digit (or digits) to implement the feature. A hookswitch flash is generally required to notify the PABX control circuitry that the subscriber wishes to employ one of the special PABX features.

Alternatively, a hookswitch flash can be used to indicate to the PABX control circuitry that the subscriber wishes to reprogram portions of the PABX software.

A hookswitch flash must be accurately timed. In particular, if the hookswitch is depressed and released too quickly, the PABX control circuitry may not recognize the flash and consequently will not implement the desired special feature. On the other hand, if the hookswitch is depressed for an exceedingly long period of time the PABX control circuitry may interpret this as meaning the subscriber has gone on hook, thereby terminating a call that may be in progress.

Subscribers frequently have an aversion to flashing a hookswitch on a telephone set because of a mental association between the act of depressing the hookswitch and the result of losing a call. Consequently, many subscribers are fearful of depressing the hookswitch for any length of time. This is particularly true of subscribers using small PABXs in the home.

Automatic hookswitch flashers effectively disassociate the act of depressing the hookswitch from causing a hookswitch flash. In operation, the subscriber depresses a push button, which in turn causes apparatus installed in the telephone set to flash the hookswitch for a predetermined length of time, regardless of how long the push button is held depressed. The subscriber is made unaware of the fact that the hookswitch is being depressed, and consequently no longer fears losing a call which is in progress.

Hookswitch flashers, in the past, have incorporated special electro-mechanical circuitry such as relays and special timing circuits into the subscriber's telephone set. In prior art hookswitch flashers a push button switch was installed in the housing of the telephone set and was connected to specialized circuitry disposed therein for causing an accurately timed hookswitch flash. The subscriber depresses the push button which causes a relay or other electrical switching apparatus to break the connection between tip and ring leads in the subscriber's set. Timing circuitry is enabled therein, and after a predetermined length of time the switching circuit is once again activated, thus closing the tip to ring connection and re-establishing the subscriber loop. The aforementioned timing was frequently achieved through charging a capacitor.

Because prior art hookswitch flashers required special modified telephone sets and adapted internal circuitry, installation required the services of trained telephone technicians. Installation could not be effected by the average subscriber. Also, the electrical and electro-magnetic circuitry can be subject to failure as a result of fused relay contacts, switch bouncing and other problems associated with such electrical circuitry.

The present invention is a mechanical hookswitch flasher which provides an accurately timed hookswitch flash in a straight forward and simple manner. The novel hookswitch flasher is easily installed on the subscriber's set by simply clipping it between handset cradles of a common 500 type or similar telephone set. No specialized circuitry is required and the novel hookswitch flasher is thus universally applicable. Even a young child is easily capable of installing the instant invention on a telephone set.

Because of its simple mechanical structure, the inventive hookswitch flasher is not prone to electrical or electro-magnetic failure.

What is meant in this specification by the term hookswitch, is any button or other mechanical linkage for activating the hookswitch of a telephone set.

In general, the invention is a mechanical telephone hookswitch flasher comprising a baseplate, apparatus connected at an edge of the baseplate for retaining it on a telephone set, a receptor member resiliently hinged at the edge for depressing a hookswitch on the telephone set, and an operator member resiliently hinged at the edge and disposed between the baseplate and the receptor member, for engaging and flexing the receptor member in response to being flexed through a first angle, and subsequently disengaging the receptor member in response to being flexed through a second angle greater than at least the first angle, whereby the receptor member depresses the hookswitch in response to being engaged and flexed, and releases the hookswitch in response to being subsequently disengaged.

The invention is also a method of flashing a hookswitch, comprising the steps of: firstly, depressing the operator member a first predetermined amount whereby the operator member engages the receptor member; secondly, depressing the operator member a second predetermined amount greater than the first predetermined amount whereby the receptor member depresses a hookswitch on a telephone set; and lastly depressing the operator member a third predetermined amount greater than the second predetermined amount whereby the receptor member is disengaged from the operator member and releases the hookswitch.

Figure 1B:
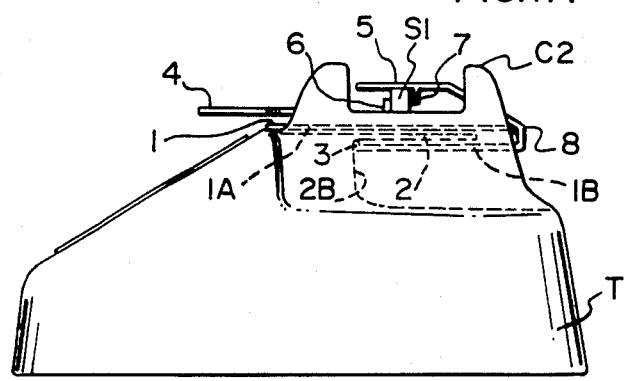
Figure 2:
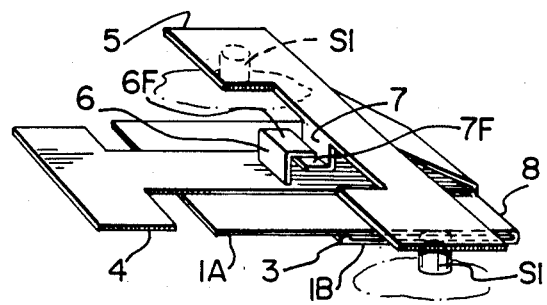

A better understanding of the invention will be obtained by reference to the detailed description below, in conjunction with the following drawings, in which:

FIG. 1A is a perspective view, partly in phantom, of the invention attached to a subscriber's telephone set, FIG. 1B is a side view, partly in phantom, of the invention attached to a subscriber's telephone set, FIG. 2 is an enlarged perspective view, partly in phantom, of the invention, FIGS. 3A, 3B, 3C and 3D are enlarged detailed diagrams showing how first and second engaging portions of the invention interact during operation of the invention.

With reference to FIGS. 1A and 1B, the invention is shown attached to a subscriber's telephone set T. A baseplate 1 of the invention having upper and lower resiliently loaded tongues 1A and 1B (FIG. 2), is clamped on a horizontal carrying plate 2 (shown in phantom) between handset cradles C1 and C2 of the subscriber's telephone set T.

An operator arm 4, which extends forwardly of the assembly is resiliently connected to tongues 1A and 1B at a rear edge 8 of baseplate 1, and contains an L-shaped appendage 6 described in greater detail below with reference to FIGS. 2, 3A, 3B, 3C and 3D.

A wing-shaped receptor member 5 is also resiliently connected to the base plate 1 at the rear edge 8 and has horizontal arm portions resting on hookswitch buttons, such as S1 in FIGS. 1A and 1B, which pass through holes in cradles C1 and C2 respectively. When a subscriber is on-hook, the handset rests on receptor member 5 such that the weight of the handset causes receptor member 5 to flex downwardly thus depressing the hookswitch buttons. Receptor member 5 further includes an L-shaped appendage 7 extending downwardly therefrom for co-operation with upwardly extending appendage 6, as described in further detail below.

During installation, the invention is clipped onto the subscriber's telephone set by clamping or sandwiching tongues 1A and 1B on carrying plate 2 between cradles C1 and C2 of the telephone set T, the tongues being pushed as far as possible onto carrying plate 2 until lower tongue 1B abuts a wall 2B of the telephone set T. A lip 3 on lower tongue 1B provides a line of pressure on the underside of carrying plate 2 by means of flexing lower tongue 1B out of its rest position, thus creating a restoring force against plate 2 for retaining it securely.

Turning to FIG. 2, an enlarged perspective view of the invention, operator arm 4 and receptor member 5 are shown connected together and to baseplate 1 at rear edge 8. Overlapping appendages 6 and 7 are shown in greater detail, and are seen to contain foot portions 6F and 7F respectively.

When a subscriber is on hook, the handset (not shown) of telephone set T rests on receptor member 5, causing hookswitch buttons S1 to be depressed. Hookswitch buttons S1 exert an upwardly directed force when depressed. However, the weight of the handset is greater than the combined upward force due to the hookswitch buttons S1 and a resilient restoring force associated with receptor member 5.

In operation, with reference to FIGS. 1A, 1B and 2, a subscriber lifts the handset of telephone set T, receptor member 5 resiliently springs up in response to release of external pressure exerted by the weight of the handset, thus releasing hookswitch buttons S1. To cause a hookswitch flash, the subscriber then depresses the front of operator arm 4, causing it to flex such that foot 6F thereof engages foot 7F of receptor member 5. Operator arm 4 can have a T-shaped front portion, as shown in FIGS. 1A and 2, which provides a convenient handle for depressing the operator arm. The words "PRESS" or "DEPRESS" can be inscribed thereon. As operator arm 4 is further depressed, foot 6F imparts a downward force on the receptor member 5, through foot 7F. The arms of receptor member 5 thus depress the hookswitch buttons S1, shown in the drawings.

Once operator arm 4 has been depressed a predetermined critical amount, corresponding to a predetermined duration of the hookswitch flash, feet 6F and 7F and operator arm 4 become disengaged as described in further detail below with reference to FIG. 3A, 3B, 3C and 3D.

Because operator arm 4 and receptor member 5 are resiliently connected at edge 8 of base plate 1, receptor member 5 is released when appendages 6 and 7 become disengaged, and springs back to its initial position in response to the combined upwardly directed force comprising the resilient restoring force and the upwardly directed force of hookswitch buttons S1. Hookswitch buttons S1 are released and the hookswitch flash is completed.

Next, operator arm 4 is released, and resiliently springs back to its initial position.

FIGS. 3A, 3B, 3C and 3D illustrate appendages 6 and 7 in detail during various operating steps of the invention.

Figure 3A:
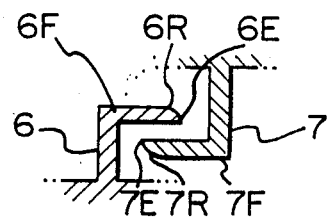

In particular, FIG. 3A illustrates edge 6E of foot 6F initially disposed above edge 7E of foot 7F. Outside rims 6R and 7R of feet 6F and 7F, respectively, are chamfered or rounded as discussed further with reference to FIG. 3D.

Figure 3B:
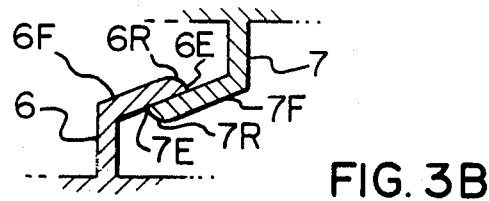

As operator arm 4, shown in FIG. 2, is depressed, feet 6F and 7F become engaged. As operator arm 4 is further depressed, feet 6F and 7F bend away from each other and edges 6E and 7E slide progressively toward each other as shown in FIG. 3B. Feet 6F and 7F are flexed in response to the upwardly directed resilient restoring force of receptor member 5 and the upwardly directed force due to hookswitch buttons S1 acting against the downwardly directed external force exerted on operator arm 4.

Figure 3C:
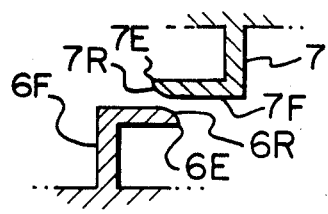

As operator arm 4 is further depressed, edges 6E and 7E slide past each other thereby disengaging feet 6F and 7F and releasing receptor member 5. Receptor member 5, shown in FIGS. 1A, 1B and 2, springs back to its initial position in response to the combined upwardly directed forces, thus completing the hookswitch flash. Feet 6F and 7F are then disposed as shown in FIG. 3C. The length of time a subscriber keeps operator arm 4 depressed is irrelevant to the operation of the device because the hookswitch flash has already been performed. Thus, the subscriber is relieved of the task of estimating the correct duration of a hookswitch flash.

Figure 3D:
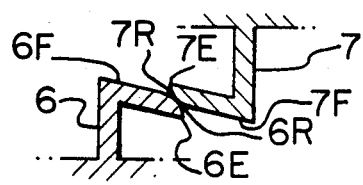

The subscriber subsequently releases operator arm 4. The chamfered rims, 6R and 7R, provide low friction surfaces at which feet 6F and 7F come into contact. Feet 6F and 7F bend slightly toward each other in response to the upwardly directed restoring force of operator member 4 acting against the downwardly directed restoring force of receptor member 5, and rims 6R and 7R slide past each other as illustrated in FIG. 3D. Operator arm 4 then springs back to its initial position, as illustrated in FIG. 3A.

In addition to feet 6F and 7F flexing in response to the subscriber depressing operator arm 4, operator arm 4 itself bends so as to cause edge 6E to be drawn toward edge 7E.

It is apparent that if a subscriber were to depress operator arm 4 inordinately quickly or slowly, an invalid hookswitch flash would result. However, L-shaped appendages 6 and 7 are initially disposed with operator arm 4 and receptor member 5 in their rest positions, such that depression of operator arm 4 in a reasonable manner will result in a valid hookswitch flash.

By varying the relative positions of edges 6E and 7E with respect to each other, different flash durations can be achieved. For instance, with reference to FIG. 3A, if edges 6E and 7E are initially disposed closer to one another a shorter duration can be achieved. Similarly, if edges 6E and 7E are disposed further apart from one another, a longer duration results. The relative positions of edges 6E and 7E can be varied either horizontally or vertically. In other words, if appendages 6 and 7 are initially disposed horizontally further apart, or feet 6F and 7F are vertically closer together, edges 6E and 7E will be closer together resulting in a shorter duration of hookswitch flash. The duration of a hookswitch flash is also determined by the resiliency of the material with which the novel hookswitch flasher is fabricated. For instance, as operator arm 4 is made more susceptible to bending, as a result of fabrication with a more resilient material, edge 6E slides toward edge 7E more easily in response to operator arm 4 being flexed.

In summary, the mechanical hookswitch flasher performs a hookswitch flash of substantially correct duration on a subscriber's telephone set in response to depression of operator arm 4. The duration of the hookswitch flash is rendered independent of the requirement that a subscriber should determine the correct flash duration. The duration is substantially determined by the initial positions of edges 6E and 7E with respect to each other, and the resilience of the members.

The invention is preferably composed of a resilient material such as plastic, whereby the resilience of the material accounts for the restoring force which causes operator arm 4 and receptor member 5 to spring back to their respective initial positions in the absence of externally applied forces.

The invention is of such simple construction that an unskilled subscriber is capable of its installation on his or her telephone set. The invention can be installed or removed in a matter of seconds and reinstalled on further subscriber's sets in an identical manner. The simple construction of the invention ensures high reliability. Also, since the subscriber does not directly depress the hookswitch, fear of accidently terminating a call is substantially overcome.

A person understanding this invention may now conceive of changes or other embodiments using the principles described herein. For instance, L-shaped appendages 6 and 7 can be replaced by a pair of permanent magnets which exert an attractive force on each other, which serves to engage the operator arm 4 and receptor member 5 until the upwardly directed resilient restoring force of the receptor member 5 is greater than the attractive force between the magnets. Alternatively, appendage 7 can be omitted and appendage 6 extended so that foot 6F extends over top of and directly engages receptor member 5. The invention can be composed of a variety of materials. For instance, the baseplate 1 may be formed of a rigid material made adherent to the top surface of carrying plate 2 while the operator arm 4 and receptor member 5 can each be composed of elastic or resilient materials.

These and other changes or embodiments are all considered to be within the sphere and scope of this invention as defined in the claims appended hereto.

I claim:

1. A mechanical telephone hookswitch flasher, comprising:
   (a) a baseplate for retention on a telephone set adjacent a hookswitch,
   (b) an operator member resiliently connected at an edge of said baseplate and initially disposed at a predetermined angle above the baseplate,
   (c) a receptor member resiliently connected at said edge and disposed at a predetermined angle above the operator member such that a portion of the receptor member rests on the hookswitch, and
   (d) means for engaging said operator and receptor members in response to the operator member being depressed a first predetermined amount, whereby the receptor member is displaced and depresses the hookswitch in response to the operator member being depressed a second predetermined amount greater than said first amount, and the receptor member is disengaged from the operator member and releases the hookswitch in response to the operator member being depressed a third amount greater than said second amount.

2. A mechanical telephone hookswitch flasher, as defined in claim 1, wherein said engaging means is comprised of:
   (a) a first L-shaped appendage projecting upwardly from the operator member, and
   (b) a second L-shaped appendage projecting downwardly from the receptor member and disposed such that the foot portion thereof is suspended between the operator member and the foot portion of said first appendage, whereby said foot portions contact each other in response to the operator member being depressed said first amount, said L-shaped appendages are resiliently flexed such that remote inside edges of said foot portions move toward each other in response to the operator member being depressed said second amount, and said edges slide past each other thereby disengaging said operator and receptor members in response to the operator member being depressed said third amount.

3. A mechanical telephone hookswitch flasher, as defined in claim 2, wherein respective remote outside rims of said foot portions are chamfered so as to provide low friction surfaces which come in contact and slide past each other in response to the operator member resiliently springing back to its initial position upon being subsequently released.

4. A mechanical telephone hookswitch flasher, as defined in claim 1, wherein the baseplate, and said operator and receptor members are plane surfaces, said baseplate being rectangularly shaped, said receptor member being substantially wing-shaped and said operator member being in the form of a T-shaped tongue.

5. A mechanical hookswitch flasher, comprising:
   (a) a baseplate for retention on a telephone set adjacent a hookswitch,
   (b) receptor means, resiliently hinged at an edge of the baseplate, for depressing the hookswitch, and
   (c) operator means, resiliently hinged at said edge and disposed between the baseplate and said receptor means, for engaging and displacing said receptor means in response to said operator means being depressed a first amount, and subsequently disengaging said receptor means in response to being depressed a second amount greater than at least the first amount, whereby said receptor means depresses the hookswitch in response to being engaged and displaced, and releases the hookswitch in response to being subsequently disengaged.

6. A mechanical telephone hookswitch flasher, as defined in claim 5, wherein said receptor means further comprises a first L-shaped appendage projecting downwardly therefrom, and said operator means further comprises a second L-shaped appendage projecting upwardly therefrom, said first and second appendages being initially disposed such that the foot portion of said first L-shaped appendage is suspended between said operator means and the foot portion of said second L-shaped appendage, whereby said foot portions contact each other and are resiliently flexed such that remote edges thereof move toward each other in response to said operator means being depressed said first amount, and said edges slide past each other thereby disengaging said receptor means in response to said operator means being depressed said second amount.

7. A mechanical telephone hookswitch flasher, as defined in claim 6, wherein respective remote outside rims of said foot portions are chamfered so as to provide low friction surfaces which contact and slide past each other in response to said operator means resiliently springing back toward its initial position upon being subsequently released.

8. A mechanical telephone hookswitch flasher, as defined in claim 5, wherein said receptor means is substantially wing-shaped with arm portions thereof resting on the hookswitch.

9. A mechanical telephone hookswitch flasher, as defined in claim 1, further comprising a ledge connected at said edge and disposed underneath and in parallel orientation with the baseplate, said ledge further comprising a lip, whereby the baseplate and said parallel ledge are clamped onto a carrying plate between handset cradles of the telephone set, and said lip exerts a line of pressure on the underside of the carrying plate to securely retain the baseplate thereon.

10. A method for flashing a hookswitch, comprising the steps of:
  (a) depressing an operator member a first predetermined amount thereby engaging a receptor member,
  (b) depressing the operator member a second predetermined amount greater than the first predetermined amount such that the receptor member depresses a hookswitch on a telephone set, and
  (c) depressing the operator member a third predetermined amount greater than the second predetermined amount whereby the receptor member is disengaged from the operator member and releases the hookswitch.

11. A mechanical telephone hookswitch flasher, as defined in claim 2, wherein the baseplate, and said operator and receptor members are plane surfaces, said baseplate being rectangularly shaped, said receptor member being substantially wing-shaped and said operator member being in the form of a T-shaped tongue.

12. A mechanical telephone hookswitch flasher, as defined in claim 3, wherein the baseplate, and said operator and receptor members are plane surfaces, said baseplate being rectangularly shaped, said receptor member being substantially wing-shaped and said operator member being in the form of a T-shaped tongue.

13. A mechanical telephone hookswitch flasher, as defined in claim 6, wherein said receptor means is substantially wing-shaped with arm portions thereof resting on the hookswitch.

14. A mechanical telephone hookswitch flasher, as defined in claim 7, wherein said receptor means is substantially wing-shaped with arm portions thereof resting on the hookswitch.

15. A mechanical telephone hookswitch flasher, as defined in claim 5, further comprising a ledge connected at said edge and disposed underneath and in parallel orientation with the baseplate, said ledge further comprising a lip, whereby the baseplate and said parallel ledge are clamped onto a carrying plate between handset cradles of the telephone set, and said lip exerts a line of pressure on the underside of the carrying plate to securely retain the baseplate thereon.

16. A mechanical hookswitch flasher, comprising:
  (a) a baseplate for retention on a telephone set adjacent a hookswitch,
  (b) receptor means, hinged to the baseplate, for depressing the hookswitch, and
  (c) operator means, hinged to said baseplate and disposed between the baseplate and said receptor means, for engaging and displacing said receptor means in response to said operator means being depressed a first amount, and subsequently disengaging said receptor means in response to being depressed a second amount greater than at least the first amount, whereby said receptor means depresses the hookswitch in response to being engaged and displaced, and releases the hookswitch in response to being subsequently disengaged.

* * * * *